(12) United States Patent
Mergen

(10) Patent No.: US 6,596,412 B2
(45) Date of Patent: Jul. 22, 2003

(54) ALUMINUM BASE BEARING ALLOY AND A BEARING ELEMENT COMPRISING A RUNNING LAYER FORMED BY THE ALLOY

(75) Inventor: Robert Mergen, Wels (AT)

(73) Assignee: Miba Gleitlager Aktiengesellschaft, Laakirchen (AT)

( * ) Notice: Subject to any disclaimer, the term of this patent is extended or adjusted under 35 U.S.C. 154(b) by 0 days.

(21) Appl. No.: 09/091,309

(22) PCT Filed: Dec. 30, 1996

(86) PCT No.: PCT/AT96/00259

§ 371 (c)(1),
(2), (4) Date: Jun. 15, 1998

(87) PCT Pub. No.: WO97/22725

PCT Pub. Date: Jun. 26, 1997

(65) Prior Publication Data

US 2003/0012977 A1 Jan. 16, 2003

(30) Foreign Application Priority Data

Dec. 20, 1995 (AT) .............................................. 2065/95

(51) Int. Cl.⁷ .......................... B32B 31/00; C22C 21/00
(52) U.S. Cl. ...................... 428/650; 420/530; 420/529; 420/535; 420/538; 420/543; 420/545; 420/547; 420/551; 420/552; 420/553
(58) Field of Search .......................... 428/650; 420/530, 420/529, 533, 538, 542, 543, 545, 547, 550, 551, 552, 553, 535

(56) References Cited

U.S. PATENT DOCUMENTS

| | | | |
|---|---|---|---|
| 4,278,740 A | * | 7/1981 | Nara et al. |
| 4,471,032 A | | 9/1984 | Fukuoka et al. |
| 4,762,729 A | * | 8/1988 | Hirano et al. .................. 427/38 |

FOREIGN PATENT DOCUMENTS

| | | |
|---|---|---|
| DE | 30 00 773 | 7/1981 |
| DE | 32 49 133 | 11/1983 |
| DE | 36 40 698 | 6/1987 |
| DE | 40 04 703 | 9/1990 |
| DE | 42 01 793 | 10/1992 |
| DE | 42 31 862 | 4/1993 |
| DE | 43 32 433 | 5/1994 |

* cited by examiner

*Primary Examiner*—Deborah Jones
*Assistant Examiner*—Jennifer McNeil
(74) *Attorney, Agent, or Firm*—Collard & Roe, P.C.

(57) ABSTRACT

The invention relates to an aluminum alloy, to a plain bearing and to a method of manufacturing a layer, particularly for a plain bearing, to which there is added as a main alloy component tin (14) and a hard material (15) from at least one first element group containing iron, manganese, nickel, chromium, cobalt, copper or platinum, magnesium, or antimony. Added to the aluminum alloy from the first elementary group is a quantity of elements for forming inter-metallic phases, e.g. aluminide formation, in the boundary areas of the matrix, and further at least one further element from a second element group containing manganese, antimony, chromium, tungsten, niobium, vanadium, cobalt, silver, molybdenum of zirconium, for substituting a portion at least of a hard material of the first element group in order to form approximately spherical or cuboid aluminides (7).

17 Claims, 5 Drawing Sheets

Figure 1:
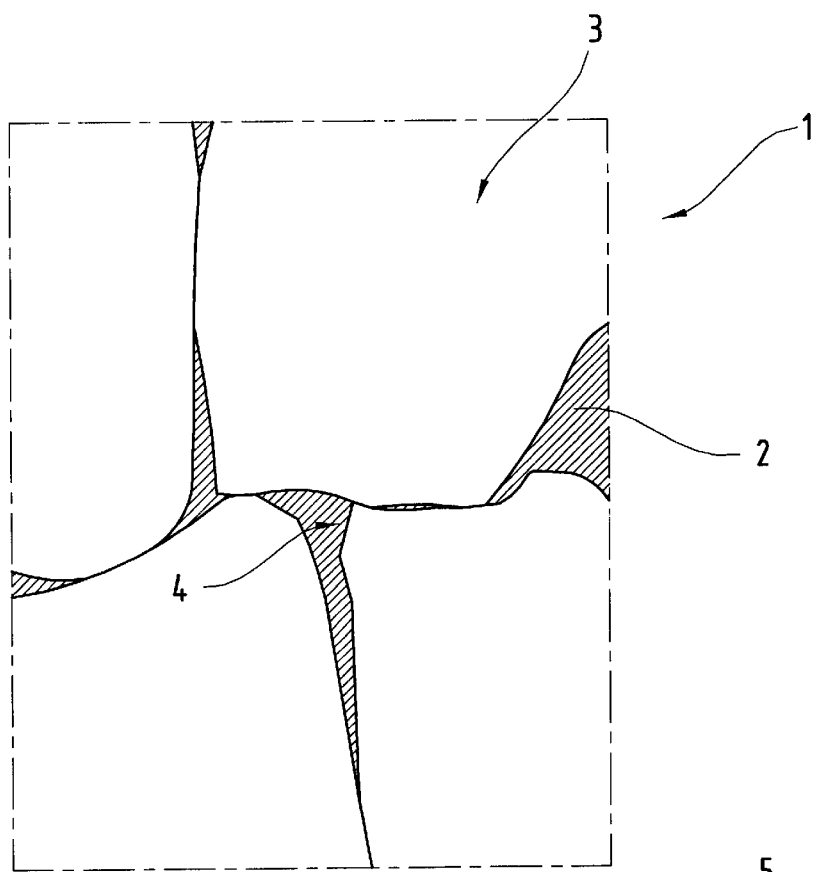

ALUMINUM BASE BEARING ALLOY AND A BEARING ELEMENT COMPRISING A RUNNING LAYER FORMED BY THE ALLOY

The invention relates to an aluminum base bearing alloy and a bearing element comprising a running layer formed by the alloy.

In order to avoid the disadvantages of silicon-containing aluminium-tin alloys in view of a lower fatigue strength due to the stress concentration of the silicon particles on the one hand and the chip-removing effect of the silicon particles in the area of the bearing surface on the other hand, the addition of silicon to the alloy is frequently omitted. In order to improve the mechanical properties of silicon-free aluminium alloys with a high tin content of 35 to 65% by weight, it has already been proposed according to DE-A1-42 31 862 A1, in addition to 0.1 to 1.5% by weight of copper in order to improve the fatigue resistance on the one hand, to add to the alloy on the one hand lead and bismuth in an overall quantity of 0.5 to 10% by weight, other hand at least one of the elements manganese, nickel, silver, magnesium, antimony and zinc in an overall quantity of a maximum 5% by weight. Due to the high tin content however, upon hardening of the alloy from the melt, there is formed a substantially coherent tin network, which considerably impairs the structural strength of the plain bearing material and its capacity for shaping, which is of importance with a view to the conventional plating of these cast alloys with steel, and of the shaping stages involved therewith. In addition, as the tin content increases, the network structure of the tin in the aluminium matrix has an increasing influence on the mechanical properties of the plain bearing material.

Attempts have also already been made to improve the mechanical properties of aluminium-tin alloys by adding to these alloys well-known matrix-reinforcing elements such for example as copper, manganese, nickel, magnesium and tin. Such aluminium-tin alloys are known among others from DE 42 01 793 A.

Furthermore it is already known, according to DE 32 49 133 C2, to generate a heterogenous structure in aluminium-tin alloys by means of a thermal aftertreatment. By means of this aftertreatment hard particles, e.g. silicon or aluminides, are separated, enabling favourable wear properties with quite specific distribution functions.

In the case of cast alloys, according to DE-C2-36 40 698, it is necessary in order to establish the final dimension of the individual layers with shaping during the plating with steel, to undertake various shaping stages, which also require various connected thermal treatments. This compound production and in particular the various shaping stages have until now prevented the use of strength-increasing alloying measures.

A layer material for plain bearing elements with a tin content of between 0.5% by weight and 20% by weight is known from DE 40 04 703 A1. By means of the addition of nickel and manganese an attempt is substantially made to produce manganese-containing hard particles in order to improve the wearing properties of such a plain bearing element. A disadvantage here is however that, despite the addition of elements forming hard particles, the tin content remains restricted to up to 20% by weight.

Finally, DE 43 32 433 A1 describes a multilayer plain bearing with a bearing alloy layer on a basis of aluminium and tin. Here also the tin content of the aluminium alloy for the bearing alloy layer is restricted to 20% by weight, and the attempt is made to improve the strength properties of such an aluminium-tin alloy by adding to the alloy elements forming hard material.

The object underlying the invention is to provide an aluminium alloy whose mechanical properties are clearly better, even at higher tin contents.

The object is achieved with an Al base bearing alloy with an alloy matrix consisting of 16 to 32 wt-% Sn as a main alloy component, at least 1.4 wt-% Cu, at least two elements selected from a first element group consisting of Mn, Ni and Fe in a quantity of between 40% and 200% of the Cu quantity, and at least one element selected from a second element group consisting of Cr, Co, Zr, Mg, Sb, W, Nb, V and Mo, the alloy matrix containing 0.1 to 1.5 wt-% Cr, at least 0.2 wt-% of a total of Cr, Co and Zr, this total being at most 200 wt-% of the Fe and Ni content, 0.1 to 1 wt-% of a total of Zr, Mg, Sb, W, Nb, V and Mo, the ratio of Co to Fe in the alloy matrix being 1:1 to 0.2:1, and the remainder being Al with the usual impurities, wherein the elements of the first and second element groups form approximately spherical or cuboid aluminide grains in a proportion, by volume, of from 0.15% to 5% of an interrupted Sn-network structure, the aluminide grains having a maximum of 70% of the average circumferential length of the visible matrix grain boundaries, and at least 15% of the Sn grains being present in a size ratio of 1:1 to the aluminide grains.

Also of advantage is a bearing consisting of a steel support layer, a running layer formed by the above-described Al base bearing alloy, and an intermediate layer between the steel support and running layers.

The amount of Zr in the alloy matrix is 0.1% to 1.0 wt %, preferably between 0.15% and 0.5 wt %. The weight proportion is a maximum 10% for an element of the third element group of Pb, Bi, Cd and In.

Figure 2:
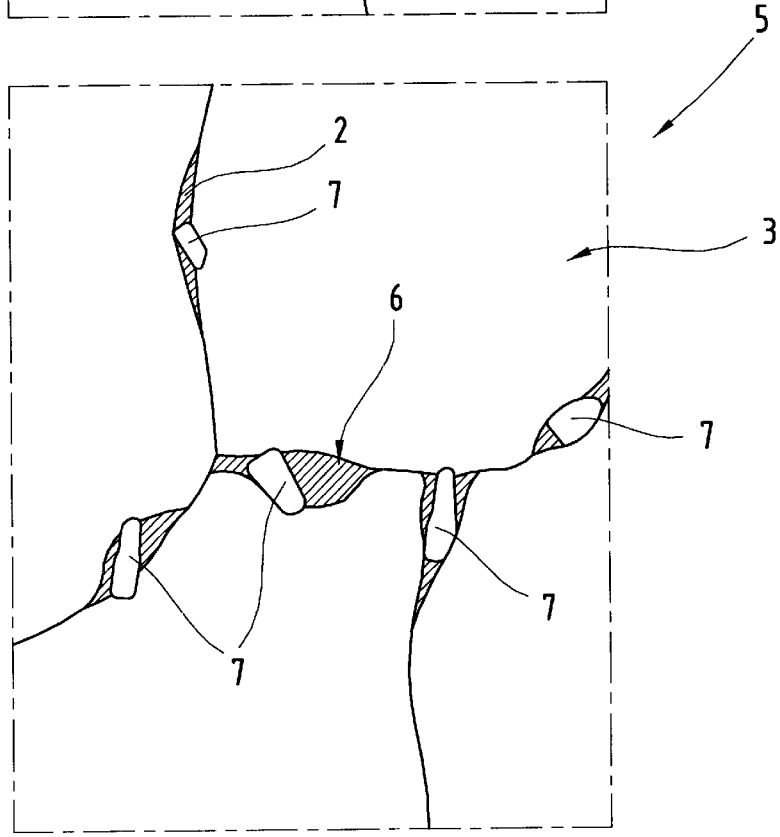
Figure 3:
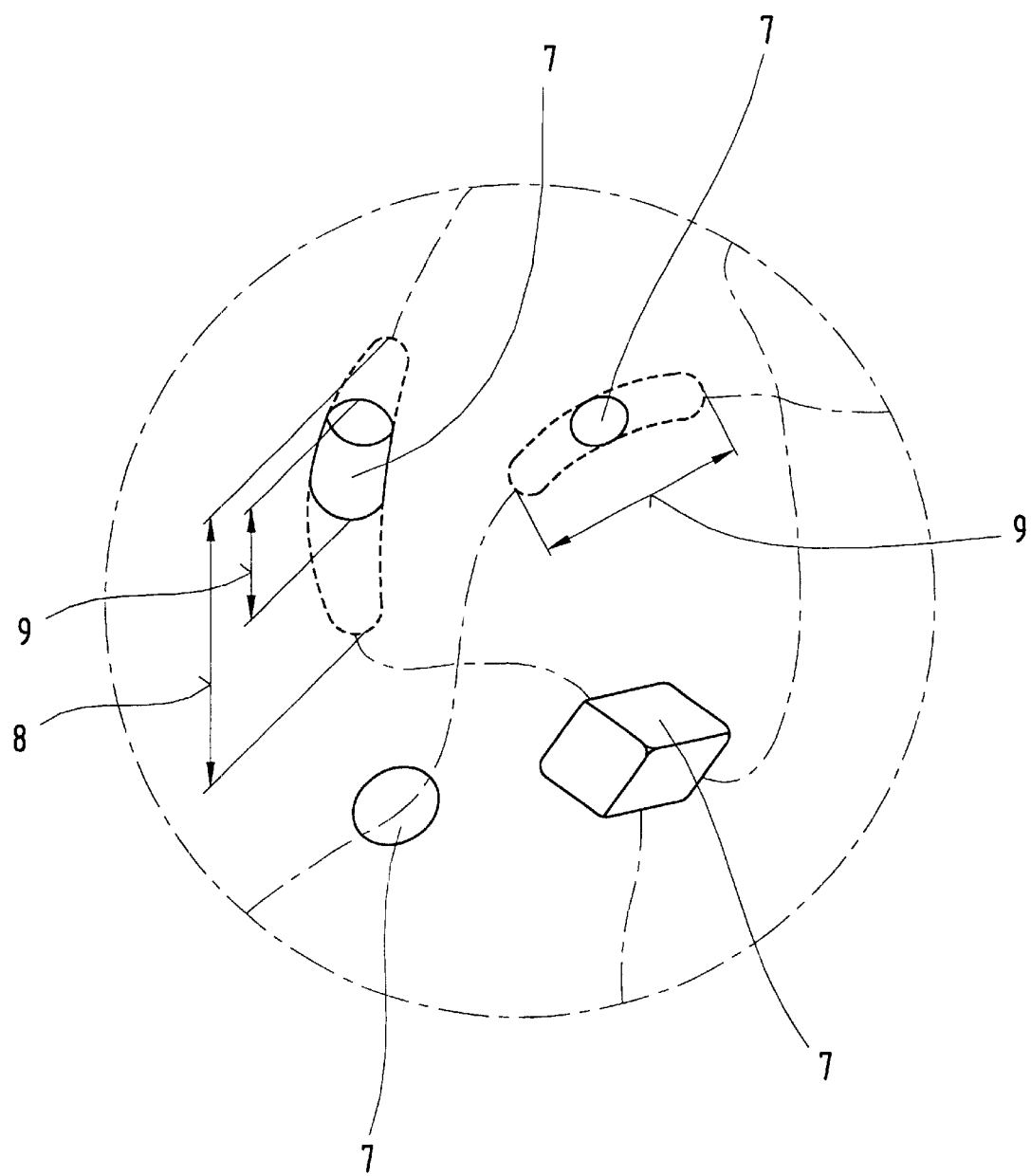
Figure 4:
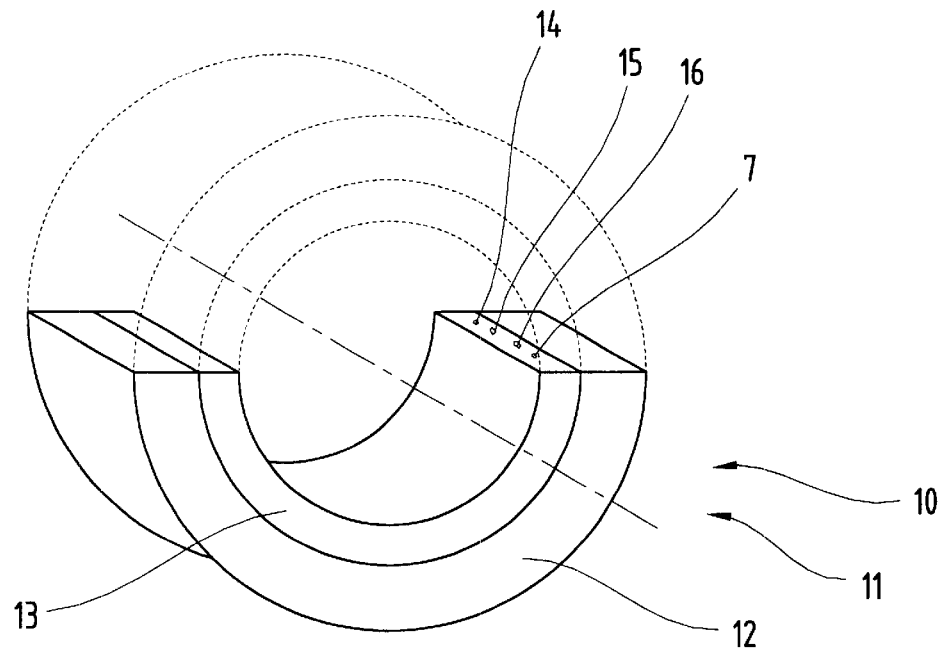
Figure 5:
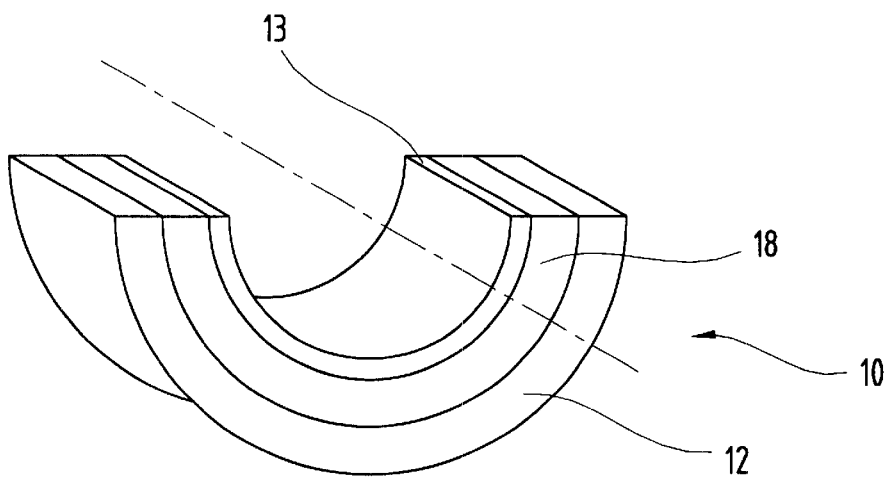
Figure 6:
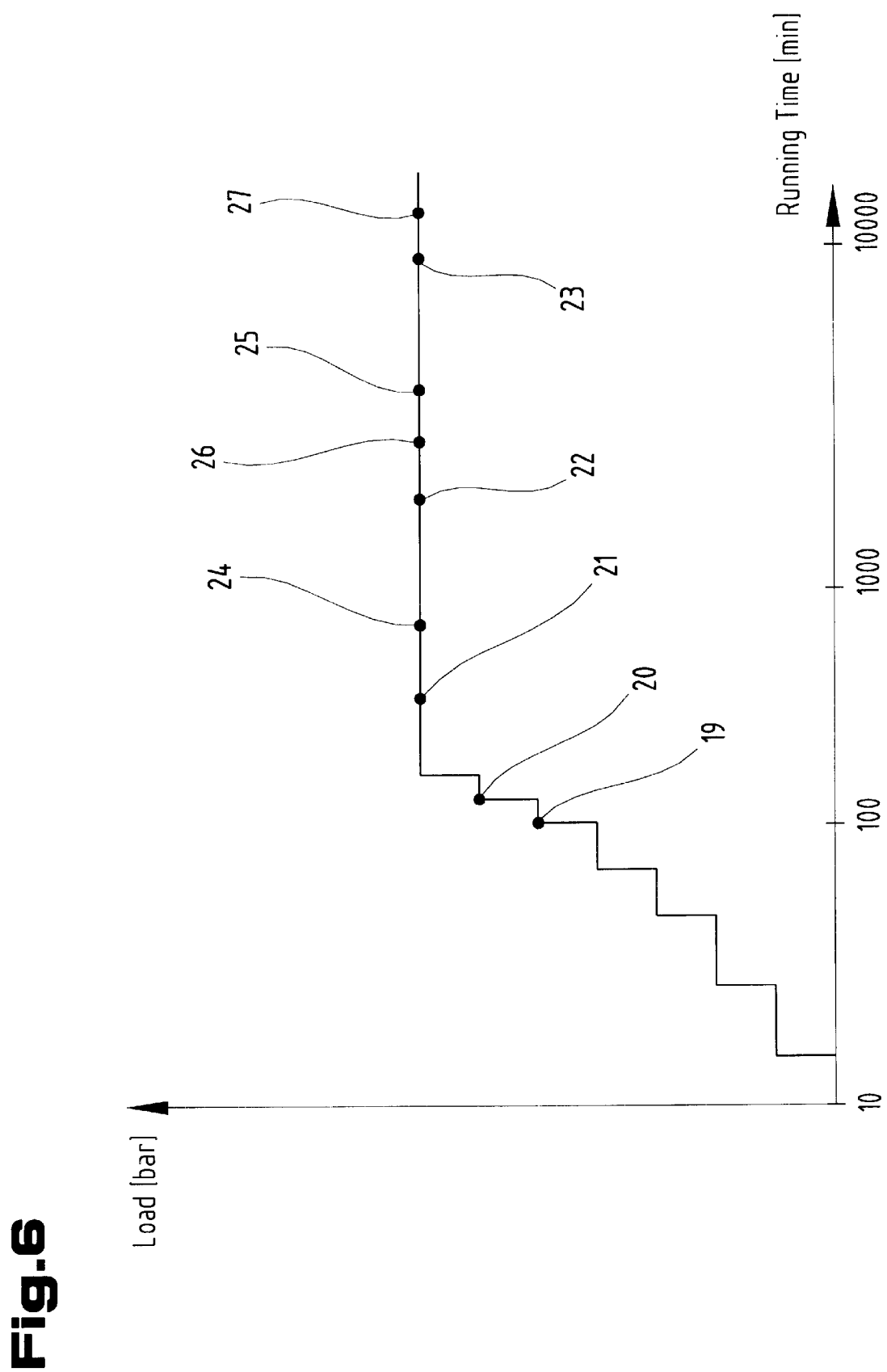
Figure 7:
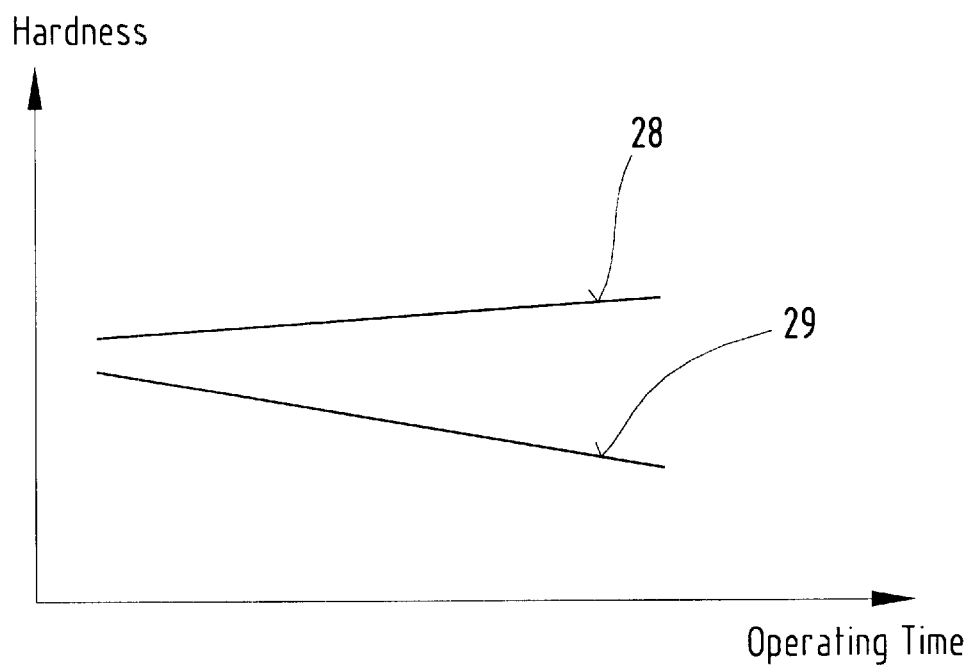
Figure 8:
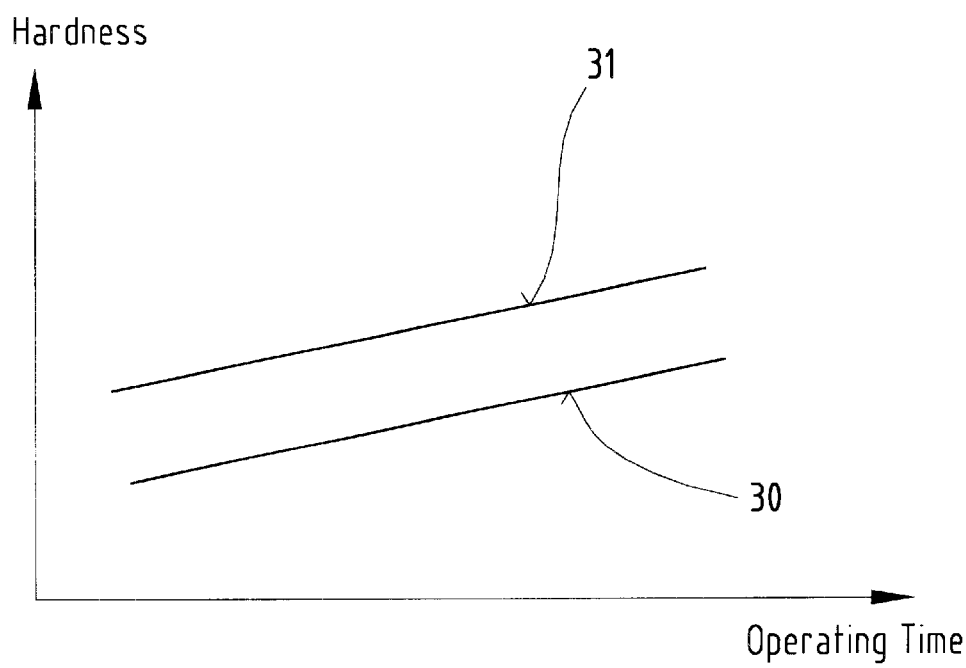

The invention will be explained in more detail in the following with reference to the views in the drawings. Shown are:

FIG. 1: a schematic micrograph of a previous bearing material for plain bearings on an aluminium basis according to prior art;

FIG. 2: a schematic micrograph of a bearing material according to the invention;

FIG. 3: a three-dimensional view of variously-formed aluminides, their initial and in their final condition;

FIG. 4: a plain bearing according to the invention, designed as a shell in a two-layer structure, shown schematically;

FIG. 5: a further plain bearing according to the invention, designed as a shell in a three-layer configuration, shown schematically;

FIG. 6: a graph of the bearing durability of plain bearings with running and intermediate layers plated onto a steel layer, and consisting of various aluminium alloys, with a bearing load changing over the running time;

FIG. 7: a graph showing the hardness behaviour in the individual layers of a plain bearing over the operational time;

FIG. 8: a graph according to FIG. 7 for a plain bearing with layers designed according to the invention.

As shown by FIG. 1, which illustrates a conventional material 1 known from prior art for plain bearings on an aluminium basis with 20% by weight of tin and 1% by weight of copper, the tin phase 2 in the alloy matrix 3 forms a substantially cohesive tin network 4, which disadvantageously influences the mechanical properties of this material 1.

This network structure could be broken up in the case of a bearing material 5 for plain bearings according to the invention, as shown in FIGS. 2 and 3.

The bearing material 5 shown according to the invention contains, in addition to 23% by weight of tin, 1.8% by weight of copper, 0.6% by weight of manganese, 0.23% by weight of iron, 0.17% by weight of cobalt, 0.14% by weight of chromium and 0.1% by weight of zircon. Despite the higher tin proportion, a clearly less cohesive tin structure 6 results, because the separated tin phase 2 is interrupted by aluminides 7 or inter-metallic phases of manganese and iron, to which the tin phase 2 is applied. As is more clearly seen from FIG. 3, these aluminides 7, despite their composition, do not have a disadvantageous effect on the mechanical properties of the bearing material 5, because due to the addition of manganese and/or cobalt and/or chromium and/or zircon in specific quantities, the stress concentration otherwise caused by an outstanding longitudinal extension 8 of the aluminides 7 shown in dotted lines, could be suppressed by their alteration into the shown spherical or cuboid spatial shape and shorter main dimension or length 9.

Naturally, the bearing material 5 according to the invention can be subjected to a conventional thermal and shaping aftertreatment, in order further to improve the mechanical properties. Due to the effect of a corresponding plastic deformation, the aluminides 7 can be brought into solution at a comparatively low treatment temperature, in order then to subject the bearing material 5 to a separation hardening of a starting treatment.

In order to indicate the special properties of the bearing material 5 according to the invention, such a bearing material 5 was compared with a conventional material 1 for a plain bearing. For this purpose the materials to be compared were cast under identical conditions to form a strip by horizontal extrusion casting, said strip having a cross-section of 10 mm×100 mm.

Due to the discharge conditions selected, a heat removal of between 3.4 and 3.7 J/s was ensured for hardening.

In addition to aluminium, the conventional material 1 consisted of 20% by weight of tin, 0.9% by weight of copper as a main alloy component, with the other impurities normal in aluminium.

The alloy according to the invention or the bearing material 5 had in addition to aluminium as a main alloy component 23% by weight of tin, 1.8% by weight of copper, 0.6% by weight of manganese, 0.23% by weight of iron, 0.14% by weight of chromium, 0.17% by weight of cobalt, 0.1% by weight of zircon and the further impurities normal in aluminium. In the bearing material 5, the tin network 4, contrary to the comparative alloy, was present in a substantially interrupted form, so that in the alloy according to the invention, despite the clearly higher tin content, a better structural strength was revealed. Accordingly, an increase in the Brinell hardness in the cast condition of at least 5 points was measured.

In order to test the deformability, both materials were subjected to an annealing treatment of 3 hours at 350° C. After subsequent grinding to remove the casting crust from the samples, the samples had a cross-section of 8 mm×80 mm. During a rolling shaping treatment without intermediate annealing, the previous material 1 allowed only a deformation of a maximum 25% in one single pass, the first cracks already appearing, which upon a reduction per pass of up to 35%, led to strips which could no longer be used.

In the bearing material 5 according to the invention, at a deformation of 20% the first cracks were already recognised, yet as the pass strength increased, these cracks grew considerably more slowly, so that at a reduction per pass of 40%, the strip could be used without problems except for a narrow lateral area.

A further shaping test comprised testing the number, permissible without intermediate annealing, of consequently-executed rolling operations with a respective reduction per pass of 5%. In the previously usual material 1, deformation had to be stopped after 8 to 10 passes. This corresponds to a maximum overall deformation of scarcely more than 40%. By means of hardness measurements carried out after each pass on the rolled surface, it was observed that the comparative alloy had a maximum hardness after 6 passes. During the following passes, a partial reduction in the hardness was even noticed, which gives evidence of structural damage.

In the bearing material 5 according to the invention, on the contrary, a particularly marked increase in the hardness was measured up to the eighth roller pass, after which the hardness remained constant until the twelfth to fourteenth roller pass and only decreased after the thirteenth to fifteenth roller pass. With a corresponding overall deformation of 48% to 53%, further deformation was no longer possible due to cracking.

FIG. 4 shows a possible design of a shell-shaped bearing member 10 of a plain bearing 11, in which the bearing member 10 consists of a support layer 12, which is normally produced from a metallic material, for example steel, and which forms a receiving means for a shell-shaped running layer 13. In order to form plain bearings 11, which serve to provide a rotarily-movable bearing for machine shafts, engine shafts, etc., two such identical bearing members 10, as shown in dotted lines, are combined to form a bearing ring, and are normally inserted into a bearing casing containing this bearing ring with corresponding form-fitting and security against twisting.

The running layer 13 is connected immobile with the support layer 12, e.g. is plated on, rolled on, welded, glued, etc., and in the construction according to the invention preferably consists of an aluminium alloy with a series of possible alloy components in order to achieve a high bearing stress resistance with respect to temperature, strength, running time and with a minimised coefficient of friction in conjunction with suitable materials for the machine shafts, engine shafts, etc.

According to a preferred construction, the running layer 13 consists of an aluminium alloy, in which the main alloy component is made up of tin 14 and a hard material 15 of at least one element 16 of a first element group containing iron, manganese, nickel, chromium, cobalt, copper or platinum, magnesium, antimony. Added to the aluminium alloy of the first element group is a quantity of elements 16, so that inter-metallic phases, e.g. aluminides 7, form in the boundary areas of the matrix. At least one further element 16 of a second element group containing manganese, antimony, chromium, tungsten, niobium, vanadium, cobalt, molybdenum or zirconium, at least a portion of the hard material 15 of the first element group is substituted, so that the aluminides 7 are converted into an approximately spherical or cuboid three-dimensional shape.

Furthermore, at least one element 16 from the group comprising calcium, lithium, silicon and titanium can be contained in the aluminium alloy according to the invention.

FIG. 5 shows another bearing member 10 with the support layer 12 and the running layer 13, in which there is disposed between the support layer 12 and the running layer 13 an intermediate layer 18, if necessary as a middle layer or binding layer. The intermediate layer 18 with the running layer 13 connected immobile therewith, in this construction, with coordination of the alloy components, the intermediate layer 18 being preferably formed by an aluminium alloy, form a composite material which decisively influences the properties sought after for the bearing member 10.

According to another preferred design for a composite material, particularly for a plain bearing 11 comprising a running layer 13 and an intermediate layer 18, these contain as main alloy components at least one element 16 of an alloy element group containing tin, zinc, copper, lead, bismuth, cadmium and/or indium, the main alloy element of the running layer 13 being tin 14, and that of the intermediate layer being zinc. At least one further element of an alloy element group containing iron, manganese, copper, nickel, chromium is added, in order to maintain a differential between the alterations in strength in the running layer 13 and in the intermediate layer 18 with approximately identical pressure and/or temperature stress between 0% and 20%. Furthermore, the running layer 13 and the intermediate layer 18 are hardenable. A strength of the intermediate layer 18 is identical to or greater than the strength of the running layer 13.

A further preferred design for a composite material, particularly for a plain bearing 11, consisting of the running layer 13 and of the intermediate layer 18, contains as main alloy components at least one element from an alloy element group containing tin, zinc, copper, lead, bismuth, cadmium and/or indium. This composite material, which forms at least a part of a plain bearing 11, enables formation of the intermediate layer 18 and/or of the running layer 13, so that they have a strength which comes to 70% to 99.5% of the peak strength of the respective running layer 13 or of the intermediate layer 18.

It is naturally also known from prior art to manufacture plain bearings 11 in an enclosed annular form, these being cast as a ring in accordance with predetermined rough dimensions, or being shaped into corresponding rings from a rolled or extruded profile, and being connected, particularly welded, at the resultant abutting points, at the opposed end faces, to form an uninterrupted ring. For such plain bearings 11 also, the materials 1 named above for the intermediate layer 18 and/or the running layer 13 may be used.

Such plain bearings 11 are frequently produced by a composite material technique in which the various layers are connected together immobile, preferably by being plated together. Such plain bearings 11, prefabricated in strip form or in ring form, are brought to the respective dimensions with corresponding bearing tolerances and assembly tolerances by subsequent fine machining, and are inserted by methods of attachment technology in bearing receiving means of bearings or motor casings, and are held secure against rotation by securing members or also by gluing.

FIG. 6 shows a graph in which the load in bar is entered on the abscissa, and the running time in minutes with a logarithmic division is entered on the ordinate.

As is known, because of load on a bearing member 10, particularly the temperature and pressure load during a so-called running-in phase and even thereafter, there is an alteration in strength, the alteration being dependent on the ingredients of the alloy. After this so-called running-in period and reaching specific threshold values, no further substantial alterations in the strength occur until the end of a running time is reached, at which such a bearing becomes unusable due to material fatigue.

With reference to the examples of various layer structures described in the following for such plain bearings 11, the bearing structure according to the invention and its effect on the bearing service life is explained.

EXAMPLE 1

In the case of this plain bearing 11 the support layer 12 is made of a steel, and the running layer 13 of an aluminium alloy, particularly AlZn4.5, which is connected immobile to the support layer 12.

EXAMPLE 2

In the case of this plain bearing 11 the support layer 12 is formed from a steel. Applied to the support layer 12 is the intermediate layer 18 of pure aluminium, and upon this the running layer 13 of an aluminium Sn alloy, for example AlSn6Cu or AlSn20Cu.

EXAMPLE 3

In this plain bearing 11, the support layer 12 is formed from a steel. Applied by sputtering to the support layer 12 is the intermediate layer 18 comprising a CuPb-alloy and upon this the running layer 13 of AlSn20.

EXAMPLE 4

In this construction of a plain bearing 11, the support layer 12 consists of steel. In the first variant construction, there is applied to this support layer 12 of steel an intermediate layer 18 of pure aluminium, and in turn on this a running layer 13 according to the invention.

In order now to be able to test the bearing behaviour of a plain bearing 11 and to assign it to various categories of use, the bearing durability behaviour can be ascertained and tested with reference to predetermined test methods. In order to simulate the load for example with a shaft rotating at a predetermined rotary speed, the load acting on the bearing casing is applied, operation being for example, in dependence on the bearing size in the cylinder size used, with a hydraulic pressure of 75 bar. When the maximum bearing load is then achieved, the test is carried on until the bearing is damaged by crushing of the running layer 13 or formation of scores in the area of the running or intermediate layers 13, 18 or by friction to such an extent that it must be replaced. The definition of the point at which this damage is so assessed that the bearing is no longer usable, is to be ascertained in detail before each individual sequence of tests.

The graph now shows the bearing durability behaviour of the designs of the individual plain bearings 11 described previously with reference to Examples 1 to 4.

As will be seen from observation of the graph, which represents among other things a simple plain bearing 11 known from prior art according to Example 1, such a plain bearing 11 fails due to abrasion of the bearing point before reaching the maximum stress at point in time 19, as the graph shows.

Better bearing resistance behaviour is already achieved with a design, likewise known from prior art, of a plain bearing 11 with a three-layer structure, in which the support layer 12 is of steel, the intermediate layer 18 of pure aluminium and the running layer 13 of an aluminium alloy alloyed with tin 14, in accordance with Example 2.

Whilst the aluminium alloy with the lower tin content likewise fails before reaching the maximum stress at point in time 20, the higher-alloyed aluminium alloy resists the maximum load over a longer period as far as a point in time 21, at which the bearing is crushed, or to a point in time 22, in which the bearing is abraded.

Extremely long service life of a bearing is achieved as is known from prior art by a bearing structure according to Example 3, as such a bearing, after a running time of 10,000 minutes, at which also point in time 23 is entered, the plain bearing 11 is still usable.

Such bearings, which achieve such a high service life in this comparative test, are termed "fatigue-tested specimens without rupture".

Finally, points in time 24 and 25 show the test results for a bearing structure, according to Example 4, in which the intermediate layer 18 consists of pure aluminium and the running layer 13 of an aluminium alloy according to the invention. With this, in contrast to the design of the bearing according to Example 3, a considerable increase in the bearing service life was achieved with a substantially simpler bearing structure.

A design is likewise usable, in which the intermediate layer 18 contains as a main alloy component zinc, and the running layer 13 as a main alloy component tin 14, as likewise indicated in Example 4.

In a further test, there were applied to the support layer 12 of steel an intermediate layer 18 of AlZn4.5, a running layer 13 of AlSn20Cu. A plain bearing 11 designed in this way shows that it is ready for use up to point in time 26.

The best result is however achieved with a bearing structure in which the support layer 12 is again of steel and the intermediate layer of an aluminium-zinc alloy particularly AlZn4.5, upon which a running layer 13 with the aluminium alloy according to the invention is applied.

The surprising factor for the person skilled in the art was however that in this combination, in which the intermediate layer 18 is alloyed with zinc and the running layer 13 according to the invention is used, a "fatigue-tested specimen without rupture" entered with a point in time 27 in the graph, could be achieved with a bearing structure considerably simpler and thus cheaper in comparison to the bearing structure according to Example 3.

FIGS. 7 and 8 show the alteration in the hardness over the operating time of a plain bearing in the form of illustrations, the configuration of hardness being dependent on the different composition between running layer 13 and intermediate layer 18.

As the support layer 12 of steel is always the same, this is no longer considered in the study, as also the hardness of the steel layer scarcely changes over the operational period.

The essential factor is rather that, depending on the alloy of the running and intermediate layers 13 and 18, a different hardness results.

As already explained before, it is advantageous for a long-lasting interruption-free operation and a long bearing service life if the alterations in hardness in the intermediate layer 18 and in the running layer 13 are roughly similar, i.e. only small differences occur between 0% and 20% in the hardness alteration over the operational life. Favourable results for practice are achieved, if, as shown in the graph in FIG. 7, the aluminium alloy according to the invention, which is provided with a high tin proportion, is used as the running layer 13, and pure aluminium as the intermediate layer 18. In this embodiment it is apparent that due to the hardening of the aluminium alloy according to the invention the hardness increases over the operational life, while in contrast, as already known from prior art, due to the effects of heat and pressure, the pure aluminium loses its tensions, which cause higher strength, and with increasing operational time become softer. Due to the selection of the increase in hardness in the running layer 13 in proportion to the decrease in hardness of the intermediate layer 18, despite this a positive overall result can be achieved, which enables a high service life, of keeping to the boundary values in the alteration in hardness over the operational time.

The configuration of the increase or reduction in hardness is shown in the graph in FIG. 7 for the running layer 13 by the diagram line 28, and for the intermediate layer by the diagram line 29. A surprisingly positive result for the person skilled in the art is however afforded by a bearing structure with respect to the configuration of hardness over the operational time, if, as the graph in FIG. 8 shows, the running layer 13 according to diagram line 30 and the intermediate layer 18, as the diagram line 31 shows, are hardenable and if their hardness increases due to the temperature effect over the operational period, so that only small or no differences at all in the alteration in hardness occur during the operational period. This is achieved by the aluminium alloy, supplied with a high tin proportion and alloyed with additional alloy components, in the running layer 13, and by the aluminium alloy of the intermediate layer 18, alloyed with tin 14, as already mentioned above, by shaping and plating together, and the intermediate layer 18 being connected to the support layer 12 of steel.

It will also be seen from the graph in FIG. 8 that in this case the greater hardness of the intermediate layer, also shown by the bearing durability behaviour in the diagram in FIG. 6, a high service life of such a bearing is achieved.

List of Reference Numbers 1. material
2. tin phase
3. alloy matrix
4. tin network
5. bearing material
6. tin structure
7. aluminide
8. longitudinal extension
9. length
10. bearing member
11. plain bearing
12. support layer
13. running layer
14. tin
15. hard material
16. element
18. intermediate layer
19. point in time
20. point in time
21. point in time
22. point in time
23. point in time
24. point in time
25. point in time
26. point in time
27. point in time
28. diagram line
29. diagram line
30. diagram line
31. diagram line

What is claimed is:

1. An Al base bearing alloy comprising
   an alloy matrix comprising 16 to 32 wt-% Sn as a main alloy component,
   at least 1.4 wt-% Cu,
   at least two elements selected from a first element group consisting of Mn, Ni and Fe in a quantity of between 40% and 200% by weight of the Cu quantity, and
   the element Co,
   at least one element selected from a second element group consisting of Cr, Mg, Sb, W, Nb, V and Mo,
   the alloy matrix containing 0.1 to 1.5 wt-% Cr, at least 0.2 wt-% of a total of Cr, and Co, this total being at most 200 wt-% of the Fe and Ni content, 0.1 to 1 wt-% of Zr, at least 0.2 wt % to 200 wt % of the Fe or Ni content of a total of Mg, Sb, W, Nb, V and Mo, the ratio of Co to Fe in the alloy matrix being 1:1 to 0.25:1, and the remainder being Al with the usual impurities, wherein the elements of Co and the first element group form approximately spherical or cuboid aluminide grains in a proportion, by volume, of from 0.15% to 5% of an interrupted Sn-network structure, the aluminide grains having a maximum of 70% of the average circumferential length of the visible matrix grain boundaries, and at least 15% of the Sn grains being present in a size ratio of 1:1 to the aluminide grains.

2. The Al base bearing alloy of claim 1, wherein the weight proportion of the two elements of the first element group is between 45% and 100% based on the Cu content.

3. The Al base bearing alloy of claim 1, further comprising one element selected from a third element group consisting of Pb, Bi, Cd and In, and an element selected from a fourth element group consisting of Zn, Ca and Li, the proportion of each of the elements of the third group being between 25 wt-% and 200 wt-% of the maximum solubility of the element in the overall quantity of Sn, the overall proportion of these elements being a minimum 100% and maximum 300% of the maximum solubility of the least soluble element in Sn and the proportion of each of the elements of the fourth group being between 10% and 100% of the maximum solubility of the element in the overall quantity of Al, the overall proportion of the elements of the fourth group being at least 50% and at most 200% of the maximum solubility of the least soluble element of this group in Al.

4. The Al base bearing alloy of claim 3, wherein the quantity of each element of the third element group is at most 10% by wt.

5. The Al base bearing alloy of claim 1, wherein one element selected from a fifth element group consisting of Si and Ti is added, the overall content of the fifth element group with at least one of the second element group is less than 100% of the Cu content.

6. The Al base bearing alloy of claim 1, wherein the weight ratio of Mn to Fe is between 4:1 and 2.5:1.

7. The Al base bearing alloy of claim 1, wherein the alloy matrix contains 0.15% by wt to 0.8% by wt Cr.

8. The Al base bearing alloy of claim 1, wherein the alloy matrix contains 0.15% by wt to 0.5% by wt Zr.

9. The Al base bearing alloy of claim 1, wherein the alloy matrix contains Ni and Cr in a weight ratio of 0.5:1.

10. The Al base bearing alloy of claim 1, wherein the alloy matrix contains Co and Fe in a weight ratio of 0.75:1 to 0.5:1.

11. The Al base bearing alloy of claim 1, wherein the proportion of Sn is between 22% by wt and 28% by wt.

12. The Al base bearing alloy of claim 1, wherein the weight ratio of Mn to Fe is between 3.5:1 and 2.5:1.

13. The Al base bearing alloy of claim 1, wherein Ni and Cr is added in a weight ratio of 0.2:1.

14. A bearing element consisting of a steel support layer, a running layer formed by the Al base bearing alloy of claim 1, and an intermediate layer between the steel support and running layer.

15. The bearing element of claim 14, wherein the running layer is hardenable and said running layer has a strength not exceeding the strength of the intermediate layer.

16. The bearing element of claim 14, wherein said intermediate layer is formed of pure Al.

17. The bearing element of claim 14, wherein the intermediate layer is formed by an Al alloy containing as main components at least one element selected from the group consisting of Fe, Mn, Ni, Cr, Co, Cu, Pt, Mg, Sb, Ag and Zn.

* * * * *

UNITED STATES PATENT AND TRADEMARK OFFICE
CERTIFICATE OF CORRECTION

PATENT NO. : 6,596,412 B2 Page 1 of 1
DATED : July 22, 2003
INVENTOR(S) : Mergen It is certified that error appears in the above-identified patent and that said Letters Patent is hereby corrected as shown below:

<u>Title page,</u>
Item [22], the PCT filing date should correctly read:
-- [22] PCT Filed: Dec. 20, 1996 --

Signed and Sealed this

Thirteenth Day of January, 2004

JON W. DUDAS
*Acting Director of the United States Patent and Trademark Office*